(12) United States Patent
Keulemans et al.

(10) Patent No.: US 11,462,244 B2
(45) Date of Patent: Oct. 4, 2022

(54) TAPE BASED STORAGE DEVICE HAVING ACTUATOR INCLUDING PULLING AND CLAMPING ELECTRODES

(71) Applicant: IMEC vzw, Leuven (BE)

(72) Inventors: Grim Keulemans, Etterbeek (BE); Veronique Rochus, Embourg (BE); Maarten Rosmeulen, Ghent (BE); Xavier Rottenberg, Kessel-Lo (BE)

(73) Assignee: IMEC vzw, Leuven (BE)

( * ) Notice: Subject to any disclaimer, the term of this patent is extended or adjusted under 35 U.S.C. 154(b) by 0 days.

(21) Appl. No.: 17/645,107

(22) Filed: Dec. 20, 2021

(65) Prior Publication Data

US 2022/0223175 A1  Jul. 14, 2022

(30) Foreign Application Priority Data

Dec. 28, 2020  (EP) .................................. 20217355

(51) Int. Cl.
| | |
|---|---|
| *G11B 15/40* | (2006.01) |
| *G11B 5/008* | (2006.01) |
| *G11B 15/20* | (2006.01) |
| *G11B 15/26* | (2006.01) |
| *G11B 15/60* | (2006.01) |

(52) U.S. Cl.
CPC .............. *G11B 15/40* (2013.01); *G11B 5/008* (2013.01); *G11B 5/00813* (2013.01); *G11B 15/20* (2013.01); *G11B 15/26* (2013.01); *G11B 15/605* (2013.01)

(58) Field of Classification Search
None
See application file for complete search history.

(56) References Cited

U.S. PATENT DOCUMENTS

| | | | |
|---|---|---|---|
| 2,831,678 | A | 4/1958 | MacNeill |
| 2,956,718 | A | 10/1960 | Beveridge |
| 3,057,529 | A | 10/1962 | Fitch |
| 3,183,494 | A | 5/1965 | Welsh |
| 3,353,734 | A | 11/1967 | Burdorf et al. |

(Continued)

FOREIGN PATENT DOCUMENTS

| | | |
|---|---|---|
| EP | 3 836 384 A1 | 6/2021 |
| GB | 1071702 | 6/1967 |
| JP | 2000-251348 A | 9/2000 |

OTHER PUBLICATIONS

Extended European Search Report dated Jun. 25, 2021 in counterpart European Application No. 20217355.5 in 10 pages.

(Continued)

*Primary Examiner* — Craig A. Renner
(74) *Attorney, Agent, or Firm* — Knobbe, Martens, Olson & Bear, LLP

(57) ABSTRACT

A storage device configured to store data on a tape is provided. In one aspect, the storage device includes the tape, which is configured to store data, and a data head, which is configured to read and/or write data from and/or to the tape. The storage device further includes an actuator configured to move the tape in a length direction in a step-wise manner. The actuator can include a plurality of pulling electrodes, wherein each pulling electrode can be activated to exert a pulling force on the tape, and a plurality of clamping electrodes, wherein each clamping electrode can be activated to clamp the tape.

17 Claims, 7 Drawing Sheets

(56) References Cited

U.S. PATENT DOCUMENTS

| | | | |
|---|---|---|---|
| 4,754,185 | A | 6/1988 | Gabriel et al. |
| 4,943,750 | A | 7/1990 | Howe et al. |
| 5,235,225 | A | 8/1993 | Colgate et al. |
| 7,919,901 | B2 | 4/2011 | Erismis et al. |
| 2012/0228991 | A1 | 9/2012 | Vranish |
| 2021/0174832 | A1* | 6/2021 | Cosemans ............ G11B 15/605 |

OTHER PUBLICATIONS

Ashley et al., "Holographic Data Storage", IBM Journal of Research and Development, vol. 4, Issue 3, May 2000, pp. 341-368.

Heck et al., "Ultra-high density MEMS probe memory device", Microelectronic Engineering, vol. 87, Issue 5-8, May 2010, pp. 1198-1203.

Kurosawa et al., "Ultrasonic Linear Motor Using Surface Acoustic Waves", IEEE Transactions on Ultrasonics, Ferroelectrics, and Frequency Control, vol. 43, No. 5, Sep. 1996, pp. 901-906.

Parkin et al., "Memory on the racetrack", Nature Nanotechnology, vol. 10, Issue 3, Mar. 2015, pp. 195-198.

Patrascu et al., "Stick-slip Actuation of Electrostatic Stepper Micropositioners for Data Storage—the μWalker", Proceedings of the 2005 International Conference on MEMS, NANO and Smart Systems, 2005, 6 pages.

Sarajlic et al., "High-Performance Shuffle Motor Fabricated by Vertical Trench Isolation Technology", Micromachines, vol. 1, Jul. 2010, pp. 48-67.

Shigematsu et al., "Nanometer Stepping Drives of Surface Acoustic Wave Motor", IEEE Transactions on Ultrasonics, Ferroelectrics, and Frequency Control, vol. 50, No. 4, Apr. 2003, pp. 376-385.

Tas et al., "Modeling, design and testing of the electrostatic shuffle motor", Sensors and Actuators A 70, 1998, pp. 171-178.

\* cited by examiner

TAPE BASED STORAGE DEVICE HAVING ACTUATOR INCLUDING PULLING AND CLAMPING ELECTRODES

CROSS-REFERENCE TO RELATED APPLICATIONS

This application claims foreign priority to European Patent Application No. 20217355.5, filed Dec. 28, 2020, the content of which is incorporated by reference herein in its entirety.

BACKGROUND

Technological Field

The disclosed technology generally relates to the field of storage devices, in particular, of storage devices configured to store data on a tape or sheet. The disclosed technology further relates to a storage system including such storage devices.

Description of the Related Technology

The scaling roadmap of solid-state memory devices is currently dominated by NOT-AND (NAND) flash. NAND flash is relatively fast and has a small form factor. However, NAND flash is also relatively expensive per stored bit. In addition, the further scaling of NAND flash is becoming increasingly more difficult to achieve and may lead to an increase of its read latency.

Other major memory technologies such as hard disk drives (HDD) and tape memory have a low cost per bit. However, they are much slower than NAND flash and have a large form factor not suitable for integration in handheld devices.

Several alternative memory solutions have been proposed, such as micromechanical probe memory (Heck et al., "Ultra-high density MEMS probe memory device", Microelectronic Engineering, 2010), holographic data storage (Ashley et al., "Holographic data storage technology", IBM Journal of Research and Development 44.3 (2000): 341-368), or magnetic racetrack memory (Parkin et al., "Memory on the racetrack", Nature Nanotechnology 10.3 (2015): 195-198). However, these memory concepts are currently still at a research level and are not yet commercially available.

In other words, there is still a clear need for a novel commercially viable memory technology with a form factor and speed comparable to NAND flash, but with a higher bit density and lower cost.

SUMMARY OF CERTAIN INVENTIVE ASPECTS

Thus, it is an objective to provide an improved storage device and to provide an improved storage system. A solution to the above-mentioned disadvantages is provided by embodiments of the disclosed technology.

The above-described and other objectives are achieved by the various embodiments of the disclosed technology. Advantageous implementations of the embodiments of the disclosed technology are further defined hereafter.

According to a first aspect, the disclosed technology relates to a storage device including a tape configured to store data; a data head configured to read and/or write data from and/or to the tape; an actuator configured to move the tape in a length direction in a step-wise manner, wherein the actuator includes: a plurality of pulling electrodes, wherein each pulling electrode can be activated to exert a pulling force on the tape, and a plurality of clamping electrodes, wherein each clamping electrode can be activated to clamp the tape.

This achieves the advantage that a storage device is provided that combines a small form factor, with precise and fast read/write speeds, in particular in terms of latency and throughput. These fast read/write speeds can be achieved due to an actuation mechanism that is based on moving the tape via electrostatic forces.

The tape may be a flexible nanosheet for storing data, for example, a parallel flexible nanosheet storage. A surface area of the tape may be configured to store the data. Such a tape provides a significant area enhancement, for example, and increased ratio of the storage medium area and the overall storage device area. Thus, such a tape allows building a storage device with a small form factor. Further, the increased ratio reduces the cost per bit of the storage device.

The length of the tape may be varied from millimeters to centimeters.

The actuator can be an electrostatic shuffle tape driver that is configured to move the tape in a step-wise manner. Thereby, tape step frequencies between 1 kHz and several MHz can be achieved.

The pulling electrodes and the clamping electrodes may be configured, if activated, to excerpt an attractive electrostatic force on the tape. The actuator can be configured to move the tape in the step-wise manner by activating and deactivating the plurality of pulling electrodes and clamping electrodes according to a defined activation sequence. Thereby, the pulling electrodes and the clamping electrodes work together to move the tape forward or backward in the length direction. In particular, the pulling electrodes exert the pulling force on the tape, which causes the tape movement while the clamping electrodes define the direction of the movement (backwards or forwards).

The actuator can include at least three electrodes, namely two clamping electrodes and one pulling electrode. Preferably, the actuator includes five or more electrodes, for example three clamping electrodes and two pulling electrodes.

In an embodiment, the pulling electrodes and the clamping electrodes are alternately arranged along the length of the tape.

In an embodiment, the tape includes a conductive layer on a bottom side of the tape, which is configured to act as a counter electrode for the pulling electrodes and clamping electrodes, respectively. This achieves the advantage that the tape can be moved efficiently by the actuator based on electrostatic forces.

In an embodiment, the pulling electrodes and the clamping electrodes are arranged below the bottom side of the tape facing the conductive layer.

In an embodiment, the pulling electrodes are arranged at a further distance from the tape than the clamping electrodes.

In an embodiment, if activated, each pulling electrode is configured to deform a section of the tape by pulling the section away from a longitudinal axis of the tape, wherein the deformation causes the pulling force on the tape. This achieves the advantage that the tape can be efficiently moved by the actuator.

In particular, the tape exhibits an internal stiffness that additionally supports the movement of the tape. For example, after the pulling electrode is deactivated, the deformed tape reverses the deformation due its internal stiffness, causing an additional pushing force on the tape which supports the tape movement.

In an embodiment, the actuator is configured to move the tape in a first direction by subsequently:

a) activating a first clamping electrode of the plurality of clamping electrodes;
b) activating a pulling electrode of the number of pulling electrodes that is arranged behind (downstream of) the first clamping electrode relative to the first direction;
c) activating a second clamping electrode of the plurality of clamping electrodes that is arranged behind (downstream of) the pulling electrode relative to the first direction and simultaneously or subsequently deactivating the first clamping electrode; and
d) deactivating the pulling electrode.

This achieves the advantage that the tape can be efficiently moved by the actuator.

The above sequence requires a minimum of three electrodes, namely two clamping electrodes and one pulling electrode. For example, the actuator can include five electrodes, three clamping and two pulling electrodes, and the above sequence is expanded taking into account the additional electrodes.

In an embodiment, the actuator is configured to activate each clamping electrode by applying a clamping voltage to the clamping electrode, and the actuator is configured to activate each pulling electrode by applying a pulling voltage to the pulling electrode.

In an embodiment, the actuator is configured to control a movement speed of the tape by adjusting the pulling voltage and/or by adjusting an activation frequency of the pulling electrodes and clamping electrodes, respectively. This achieves the advantage that the tape can be moved quickly and precisely depending on a current requirement.

For example, the storage device can be set to a fine stepping mode, which is defined by a pulling voltage that is smaller than a threshold value. In this fine stepping mode, the step size of the tape movement is reduced, allowing for nanometer resolution position control with respect to the data head. Alternatively, the storage device can be set to a fast stepping mode, which is defined by a pulling voltage that is larger than the threshold value. In the fast stepping mode the movement speed of the tape is increased to, for example achieve low random access delays during memory operation.

In an embodiment, the tape further includes a bulk material, preferably polyethylene naphthalate (PEN).

In an embodiment, one or more surface regions of the tape are configured to store the data.

For example, the surface region of the tape includes a functional layer that can be read out/written to by the data head.

In an embodiment, the data head is arranged over a top side of the tape opposite to the bottom side.

In particular, the data head may be arranged over the surface regions that store the data.

In an embodiment, in a first mode of the storage device, the data head is configured to read and/or write data from and/or to the tape while the tape is stationary; and, in a second mode of the storage device, the data head is configured to read and/or write data from and/or to the tape while the tape is moving.

In an embodiment, the storage device further includes two cavities which are arranged, in the length direction, in front of and behind the actuator, respectively; wherein each cavity is configured to receive a part of the tape, in particular an end part of the tape.

In an embodiment, the storage device is configured to fold the tape in each cavity. This achieves the advantage that the overall size of the storage device can be reduced. In particular, a tape with a length of up to 10 mm can be folded to a much smaller size. In particular, the cavity only needs to be big enough to accommodate the folded tape.

In an embodiment, the storage device further includes a plurality of folding electrodes arranged in each cavity, wherein the plurality of folding electrodes are configured to fold the tape. This achieves the advantage that the tape can be folded and unfolded in an efficient manner for a compact storage of the tape.

According to a second aspect, the disclosed technology relates to a storage system including a plurality of storage devices according to the first aspect of the disclosed technology embedded in a substrate.

BRIEF DESCRIPTION OF THE DRAWINGS

Embodiments of the disclosed technology will be explained with reference to the following figures.

DETAILED DESCRIPTION OF CERTAIN ILLUSTRATIVE EMBODIMENTS

Figure 1:
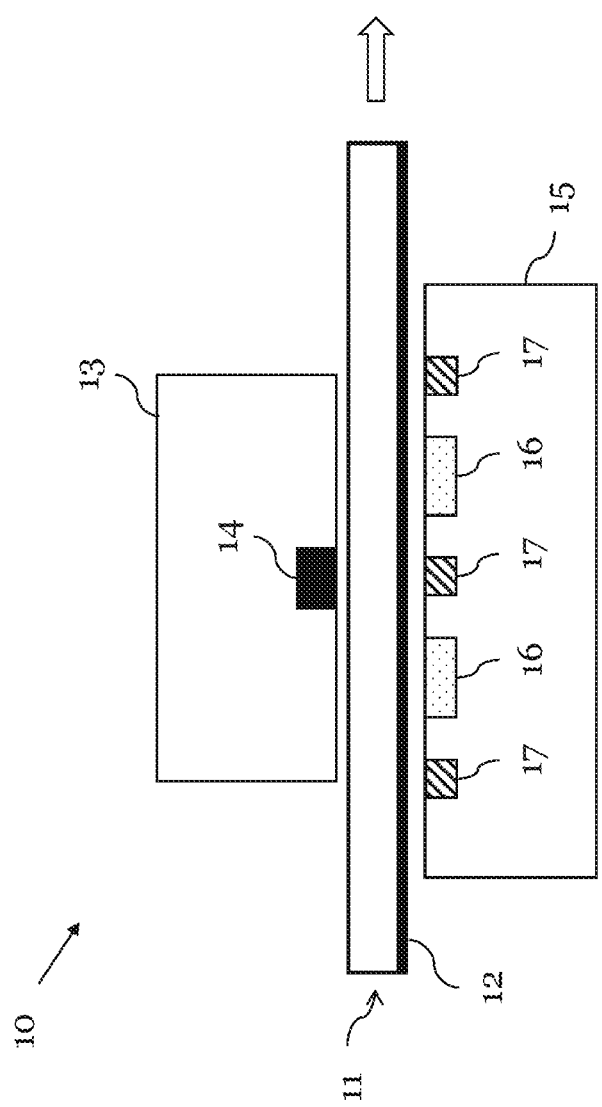
FIG. 1 shows a schematic diagram of a storage device according to an embodiment of the disclosed technology.

FIG. 1 shows a schematic diagram of a storage device 10 according to an embodiment of the disclosed technology.

The storage device 10 includes a tape 11 configured to store data, a data head 14 configured to read and/or write data from and/or to the tape 11, and an actuator 15 configured to move the tape 11 in a length direction in a step-wise manner. The actuator 15 includes a plurality of pulling electrodes 16, wherein each pulling electrode 16 can be activated to exert a pulling force on the tape 11, and a plurality of clamping electrodes 17, wherein each clamping electrode 17 can be activated to clamp the tape 11.

The actuator 15 may be a linear stepper motor that translates mechanical deformation of the tape 11, for example bending, into a net forward or backward displacement.

The pulling electrodes 16 and the clamping electrodes 17 may be configured, if activated, to excerpt an attractive electrostatic force on the tape 11. The actuator 15 can be configured to move the tape in the step-wise manner by activating and deactivating the plurality of pulling electrodes 16 and the plurality of clamping electrodes 17 according to a defined activation sequence.

Each of the pulling electrodes 16 and each of clamping electrodes 17 are activated by applying a defined pulling voltage and a clamping voltage to the electrodes 16, 17, respectively.

The storage device 10 that is depicted in FIG. 1 includes three clamping electrodes 17 and two pulling electrodes 16, which are alternately arranged along the length of the tape 11. However, a different number of pulling and clamping electrodes 16, 17 is also possible. In general, the actuator 15 includes at least one pulling electrode 16 and two clamping electrodes 17 to be able to move the tape.

The tape 11 may be a flexible micro- or nanosheet for storing data, for example, a parallel flexible nanosheet storage. The tape 11 can also be a tube or a rod with a certain flexibility that allows deformation. The length of the tape 11 may be varied from millimeters to centimeters.

The tape 11 can be made of a polymer film or foil, for example polyethylene naphthalate or polyimide.

The tape 11 can include a functional layer for data storage on its top side, for example the functional layer may include a storage element that can be read out/written to by the data head.

The tape 11 may be configured to store data based on various different storage strategies, for example, immobilized charges (similar to flash), topographic storage (for example, generated by thermomechanical indentation of the tape surface), phase-change storage, magnetic storage, ferroelectric storage, and resistive storage or electromechanical storage. The data head 14 can be configured to read/write data from/to the tape 11 according to the storage strategy. The data head 14 can be a read/write array.

The data head 14 can be arranged over the top side of the tape 11 in a data module 13 of the storage device 10. The data module 13 can be included in or connected to the actuator 15.

The tape 11, in some examples, includes a conductive layer 12 on its bottom side. This conductive layer 12 may be configured as a counter electrode for the electrostatic actuation by the pulling electrodes 16 and clamping electrodes 17, which are arranged below the bottom side of the tape 11. The conductive layer 12 can be a continuous metallic thin film or an intrinsically conductive polymer (ICP) film.

A stepped or latched operation of the actuator 15 may be performed by sequentially applying AC or DC voltages (in the range of 0.1 to 100 volt) between the clamping respectively pulling electrodes 17, 16 and the conductive layer 12 configured to act as a counter-electrode of the tape 11.

Figures 2A, 2B:
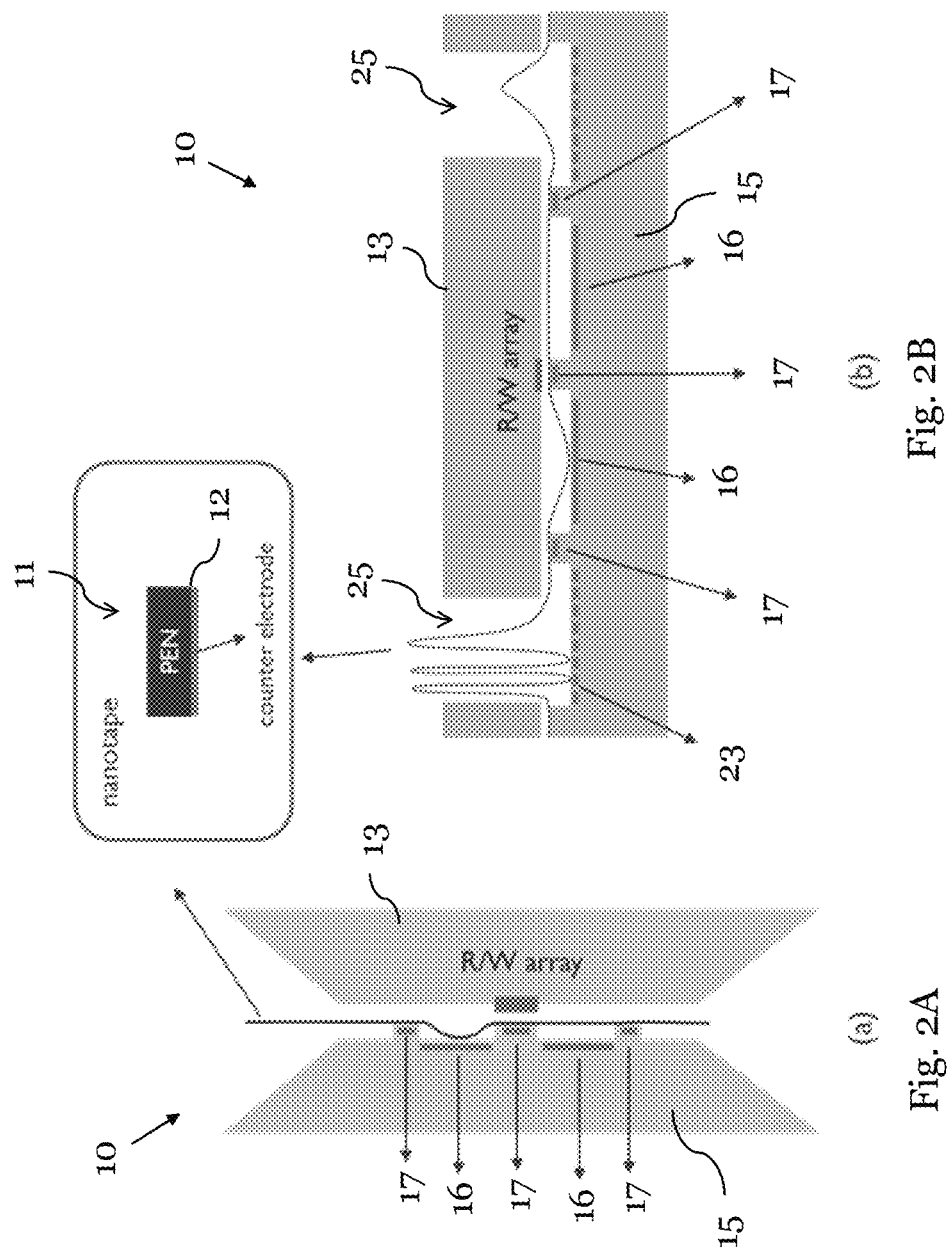
FIGS. 2A and 2B show schematic diagrams of a storage device according to further embodiments of the disclosed technology.

FIGS. 2A and 2B show schematic diagrams of the storage device 10 according to further embodiments of the disclosed technology.

FIG. 2A shows an out-of-plane, for example, vertically arranged, version of the storage device 10 and FIG. 2B shows an in-plane, for example, horizontally arranged, version of the storage device 10.

The out-of-plane arrangement of the storage device 10, as shown in FIG. 2A, has the advantage that a surface area that is occupied by the actuator 15 can be decreased with respect to the planar arrangement. Thus, a larger number of storage devices 10 could be integrated in a certain area. Thereby, each out-of-plane storage device could have a tape 11 with a shorter length, leading to an overall higher area enhancement and/or lower access times.

In the example storage devices 10 shown in FIGS. 2A and 2B, the pulling electrodes 16 are arranged at a further distance from the tape 11 than the clamping electrodes 17. In particular, the pulling electrodes 16 may be recessed with respect to the clamping electrodes 17 to support the movement of the tape.

For example, if activated, each pulling electrode 16 can be configured to deform a section of the tape 11 by pulling the section away from a longitudinal axis of the tape 11. This deformation can result in a pulling force on the tape 11 towards the activated pulling electrode 16. By clamping the tape 11 on one side of the activated pulling electrode 16, the tape 11 is only pulled from the other (not-clamped) side, resulting in a lateral movement of the non-clamped side of the tape 11 towards the pulling electrode 16.

Furthermore, the tape 11 may exhibit an internal stiffness that, additionally, supports the tape 11 movement after this deformation. In particular, after the pulling electrode 16 is deactivated again, the deformed tape reverses the deformation due to its internal stiffness, causing a pushing force on the tape. By clamping the tape 11 on the other side of the deactivated pulling electrode 16, the internal stiffness pushes the tape 11 further in the length direction. The internal stiffness of the tape 11 may mostly stem from its bulk material 21, which can be polyethylene naphthalate (PEN).

Further, the internal stiffness of the tape 11 can be modulated by at least one additional counter-electrode (not shown in FIGS. 2A and 2B) on the opposite side of the tape, for example, above the top side of the tape 11.

The length of the pulling and clamping electrodes 16, 17 can be in the range of 100 nm to 10 µm. In particular, the pulling electrode 16 can be longer than the clamping electrode 17.

The storage device 10 as shown in FIG. 2B may further include two cavities 25 which are arranged, in the length direction, in front of and behind the actuator 15, respectively. Each of these cavities 25 may receive an end part of the tape 11. In particular, the end parts of the tape 11 can be folded in each cavity, which allows reducing the form factor of the storage device 10.

The storage device 10 may include a plurality of folding electrodes 23 that are arranged in each cavity 25. The folding electrodes 23 can be configured to guide a controlled stacking or folding of the tape 11 in the cavities 25.

Furthermore, the actuator 15 may include additional stator electrodes for an increased motor control, such as capacitive displacement sensing for closed loop operation.

The storage device 10 as shown in any one of the previous FIGS. 1, 2A and 2B can form an electrostatic shuffle driven mechanical memory device. Such a storage device 10 combines several advantages, in particular, when compared to other commonly used memory or actuation concepts:

Firstly, the storage device 10, especially the actuator 15 can be compatible with common photolithographic fabrication processes and can, thus, be produced quickly and at low costs.

Secondly, there are only limited requirements on the storage medium. The flexible tape 11, for example, only requires fragments with continuous conductive film on its bottom side, which are easy to generate. There is, preferably, no need for structured metallic or high-k islands on the tape 11.

Further, the actuator 15, in principle, can allow for an unlimited displacement range with nanometer resolution. In addition, the storage device 10 can be inherently shock resistant, because the tape 11 may be clamped to the actuator 15 at any point in time. This may also prevent undesired resonances and vibration rejection.

Lastly, the actuator 15 can be scalable. In particular, electrostatic step motors, generally, have favorable scaling characteristics (maximum operational frequency increases to MHz when scaling to the micro domain). Electrostatic pull and push forces in the order of mN can still be reachable on the microscale. This is, particularly, an advantage over electromagnetic motors that do not scale well into the micro-domain, because they require permanent magnets and have a high energy consumption to operate.

Figure 3:
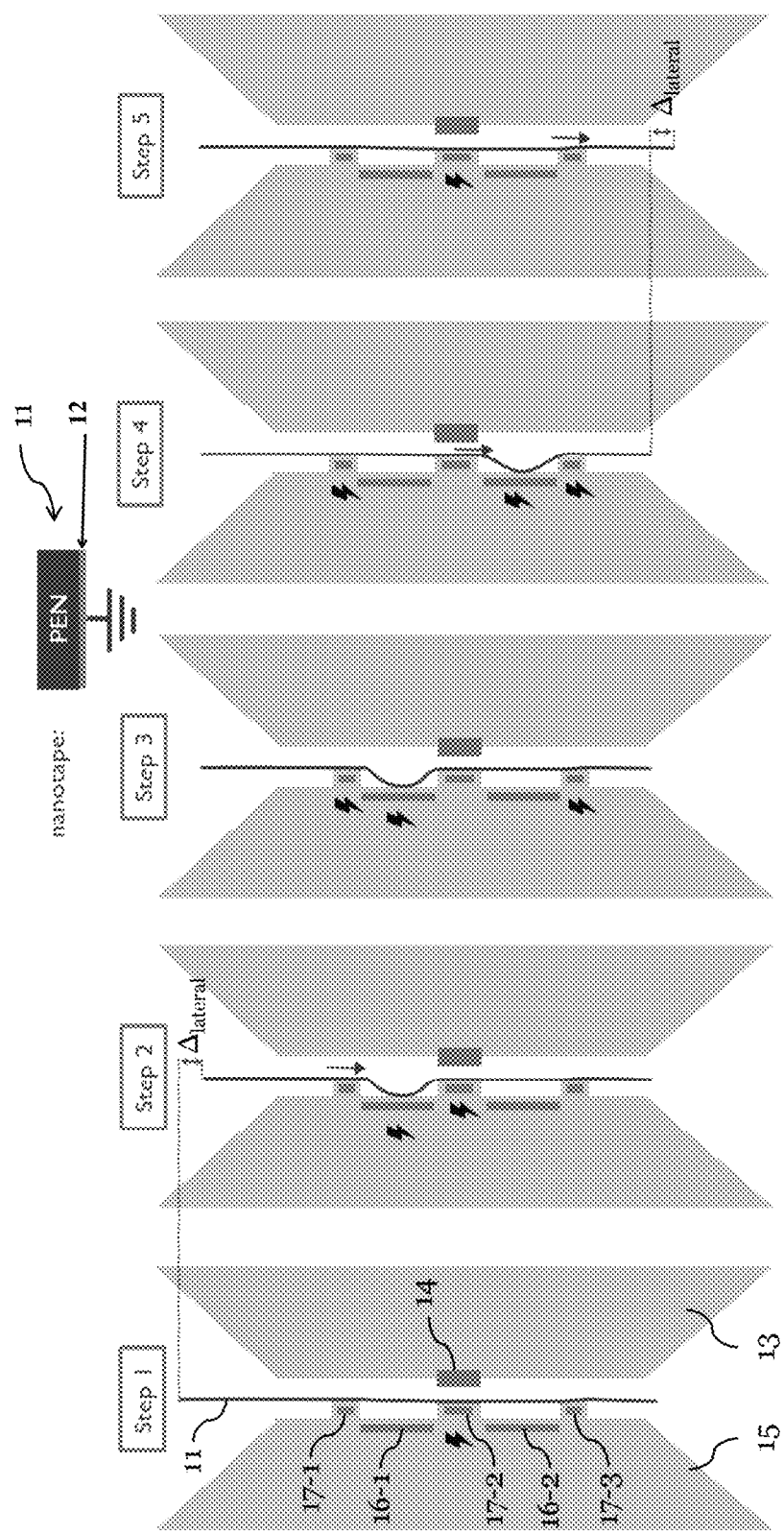
FIG. 3 shows a schematic diagram of a possible activation sequence of an actuator of a storage device according to an embodiment of the disclosed technology.

FIG. 3 shows a schematic diagram of a possible activation sequence of the actuator 15 of the storage device 10 according to an embodiment of the disclosed technology.

In particular, FIG. 3 shows an actuation sequence for the pulling electrodes 16 and clamping electrodes 17 for moving the tape 11 for one step. The actuator 15 of the storage device 10 in FIG. 3 includes one center clamping electrode 17-2, two outer clamping electrodes 17-1, 17-3, and two pulling electrodes 16-1, 16-2, which are arranged in-between the clamping electrodes 17-1, 17-2, 17-3. The activation sequence shown in FIG. 3 can be executed by any one of the storage devices 10 shown in FIG. 1, 2A or 2B.

In a first step (step 1), the tape is clamped by the central clamping electrode 17-2, which is arranged directly below the data head 14.

In a second step (step 2), pulling electrode 16-1 is additionally activated. This causes a section of the tape 11 to be pulled into the recession of the pulling electrode 16-1 and, thus, results in a pulling of the (not-clamped) side of the tape 11 towards the pulling electrode. Thereby, the tape is laterally pulled by a length of $\Delta_{lateral}$ towards the pulling electrode 16-1.

In a third step (step 3), the central clamping electrode 17-2 is deactivated and the two outer clamping electrodes 17-1 and 17-3 are activated.

In a fourth step (step 4), the pulling electrode 16-1 is deactivated and the pulling electrode 16-2 is activated instead, causing the tape 11 to move under the data head towards pulling electrode 16-2.

In a fifth and final step (step 5), the central clamping electrode 17-2 is reactivated and all other electrodes are deactivated, causing the tape 11 to stiffen-up and be pushed away from the central clamping electrode 17-2 by its internal stiffness.

The steps 1 to 5 result in one movement step of the tape 11 by a lateral distance of $\Delta_{lateral}$. By cyclically repeating steps 1-5, the tape can be moved under the data head 14 in a quick and precise manner. For example, tape step frequencies between 1 kHz and several MHz as well as nanometer positioning accuracies over the complete displacement range of the storage medium (mm to cm) can be achieved.

By regulating the pulling voltage that is applied to the pulling electrodes 16-1, 16-2, an operating mode of the actuator 15 can be set to a fine stepping mode or to a fast stepping mode, respectively.

Figure 4A:
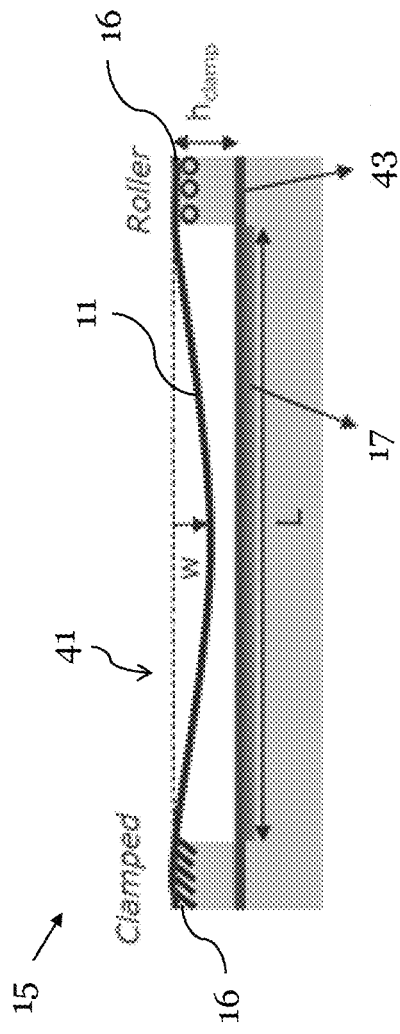
FIGS. 4A and 4B show schematic diagrams of an actuator of a storage device operating in two different modes according to an embodiment of the disclosed technology.
Figure 4B:
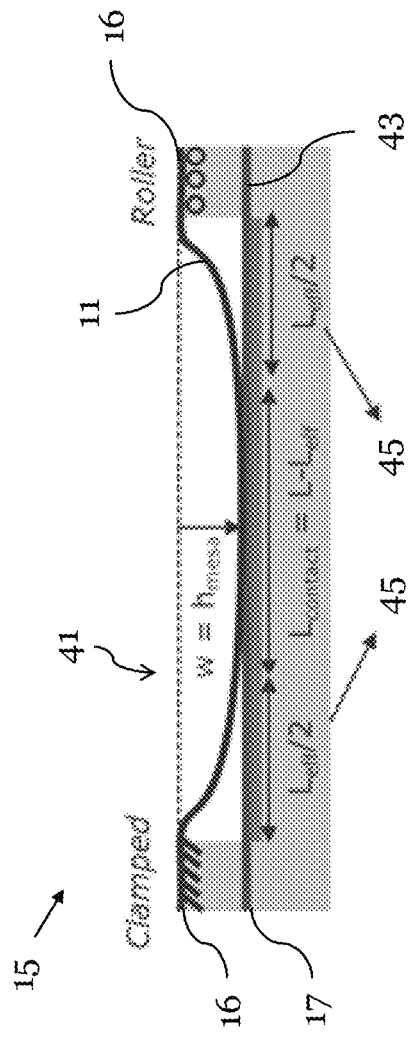

FIGS. 4A and 4B show schematic diagrams of a part of the actuator 15 of the storage device 10 operating in two different modes according to an embodiment of the disclosed technology. In particular, FIG. 4A shows the actuator 15 in the fine stepping mode and FIG. 4B shows the actuator 15 in the fast stepping mode.

FIGS. 4A and 4B show a part of the actuator with one pulling electrode 16 and two clamping electrodes 17. The pulling electrode 16 is arranged in a recess 41 of height $h_{clamp}$ with respect to the clamping electrodes 17 and has a length of L. Further, a dielectric layer 43 of thickness $t_{diel}$ is arranged over the pulling electrode 16. In both FIGS. 4A and 4B, the left clamping electrode 17 is activated (clamped) and the right clamping electrode 17 is deactivated (roller).

In the fine stepping mode (FIG. 4A), the pulling voltage may be smaller than a threshold value. The threshold value can correspond to the pulling voltage $V_{pull-in}$ that is required so that the tape 11 is in contact with the dielectric layer 43, for example the tape 11 is pulled to the bottom of the recess 41 and touches the bottom.

In particular, when the pulling electrode 16 is activated, two forces are acting on the tape 11. The first force is the electrostatic force that causes the deformation of the tape 11. In particular, the first force is a "surface force" or "pressure force", that is, normalized to the surface of the pulling electrodes 16, and can be described by:

$$q_{el} = \frac{1}{2} \frac{\varepsilon_0 \cdot V^2}{(g_{eff} - w)^2}$$

Here, $\varepsilon_0$ is the vacuum permittivity, V is the voltage applied to the pulling electrode 16, w is the deflection of the tape 11 towards the pulling electrode 16, and $g_{eff}$ is a factor that is calculated by:

$$g_{eff} = h_{clamp} + \frac{t_{diel}}{\varepsilon_{diel}},$$

with $\varepsilon_{diel}$ being the relative permittivity of the dielectric layer 43. The second force is a restoring force due to the internal stiffness of the tape 11 that can be described by:

$$q_{mech} = k_{mech} w = \frac{384}{5} \frac{E_{tape} I_{tape}}{L^3} \cdot w$$

Here, $E_{tape}$ is the Young's modulus of the tape 11 and $I_{tape}$ is the area moment of inertia of the tape 11.

If the pulling electrode 16 is activated the tape 11 is pulled down until a force balance ($q_{mech} + q_{el} = 0$) is reached. Solving the force balance equation for the deflection w, allows to calculate the distance by which the tape is moved in a length direction in each movement step by: $\Delta_{lateral} = 2.44 \cdot w^2/L$.

In the fine stepping mode shown in FIG. 4A, the step size of the tape 11 can be minimized, by reducing the voltage applied to the pulling electrode 16 and, thus, the deflection w of the tape 11. In this way, a nanometer resolution position control with respect to the data head 14 may be achieved over the complete displacement range of the storage medium, which can be in the range from millimeters to centimeters.

In the fast stepping mode (FIG. 4B), the pulling voltage may exceed the threshold value. Therefore, a section of the deformed tape of length $L_{contact}$ is in contact with the bottom of the recess 41, wherein $L_{contact} = L - L_{eff}$. Thus, the mechanical stiffness (spring constant) of the tape 11 is defined by the two non-contact regions 45, each having a length of $L_{eff}/2$.

This changes the electrostatic force that causes the deformation of the tape 11 to:

$$q_{el} = \frac{1}{2} \int_0^{L_{eff}} \frac{\varepsilon_0 \cdot V^2}{(g_{eff} - w)^2},$$

and the restoring force to:

$$q_{mech} = k_{mech} w = \frac{384}{5} \frac{E_{tape} I_{tape}}{L_{eff}^3} \cdot h_{clamp}$$

where w=h$_{mesa}$

Solving the force balance equation for the non-contact region L$_{eff}$, allows to calculate the distance by which the tape is moved in length direction in each step according to: $\Delta_{lateral} = 2.44 \cdot h_{clamp}^2 / L_{eff}$.

In particular, in the fast stepping mode the tape speed can be enhanced by enhancing the voltage applied to the pulling electrode 16 and, thus, decreasing the size of the non-contact region L$_{eff}$, causing an enhancement of the lateral displacement $\Delta_{lateral}$. Thereby, high velocities (~m/s) for low random access delays during memory operation (~milliseconds) can be achieved.

Figure 5B:
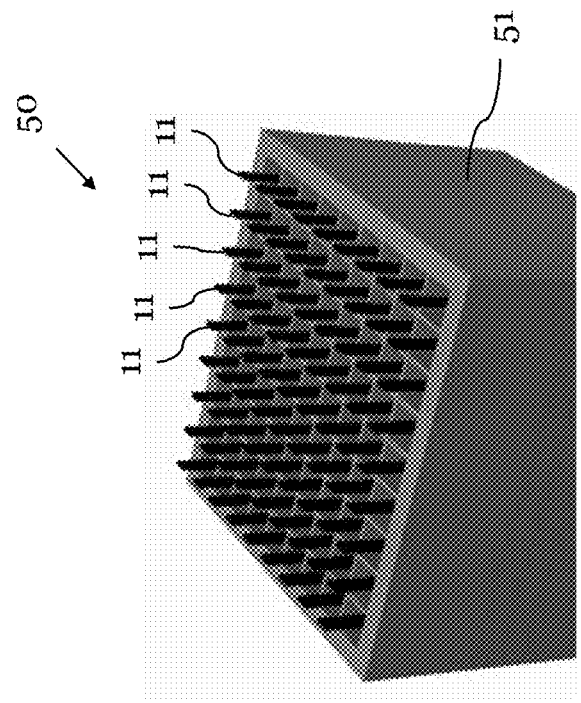
FIGS. 5A and 5B show schematic diagrams of a storage system according to an embodiment of the disclosed technology.
Figure 5A:
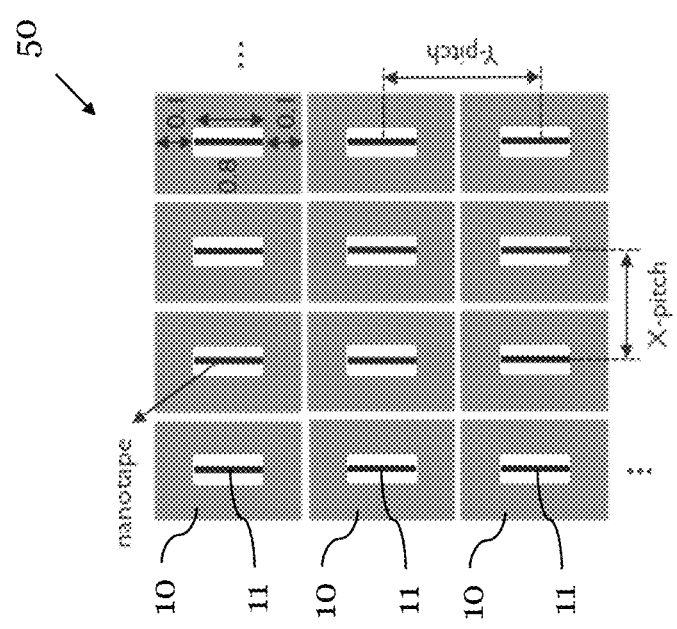

FIGS. 5A and 5B show schematic diagrams of a storage system 50 according to an embodiment of the disclosed technology. FIG. 5A is a top view and FIG. 5B is a perspective view of the storage system 50.

The storage system 50 includes a plurality of storage devices 10 embedded in a substrate 51. The plurality of storage devices 10 can, thereby, be arranged according to a square lattice with an x-pitch and a y-pitch.

Such a storage system 50 can form a data memory, for example for a handheld device.

The storage devices 10 can be arranged vertically, according to an out-of-plane arrangement, to increase the density of the storage devices 10. For example, each storage device 10 can be embedded in a cavity of the substrate 51 in a vertical manner.

Each of the storage devices 10 of the system 50 may include an actuator 15 which can move (push/pull operation) the flexible tape 11 (nanotape or nanotube) over a data head 14. For a fixed in-plane density, the required tape 11 length can be dependent on the density of the storage devices 10. The typical in-plane dimension of the storage device 10 is of the order of microns, while the length of the tape 11 can be varied from millimeters to centimeters. In this way, tape 11 densities of $10^3$ to $10^4/mm^2$ can be achieved.

Figure 6:
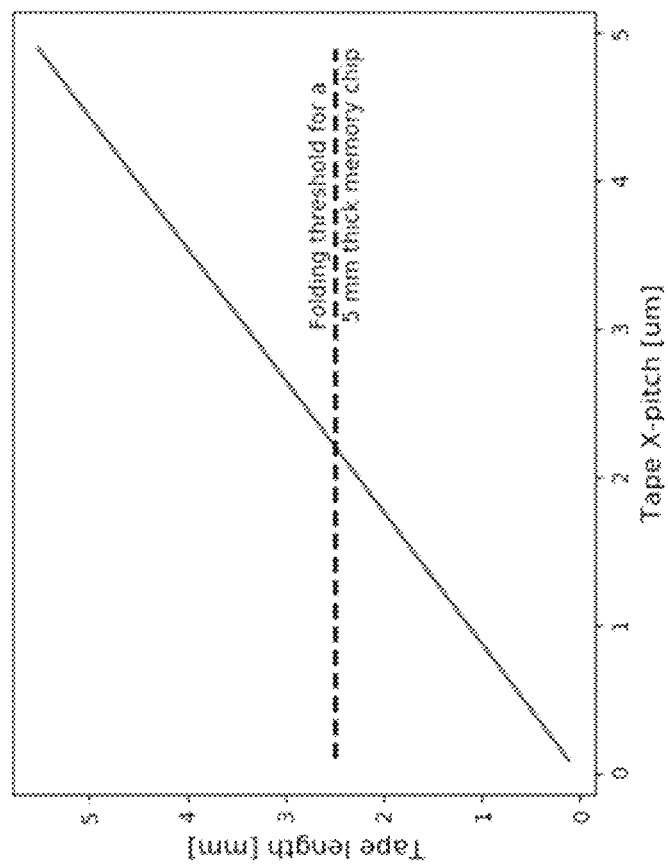
FIG. 6 shows a chart of the relationship between the dimensions of a tape and the arrangement of storage devices in a storage system according to an embodiment of the disclosed technology.

FIG. 6 shows a line chart highlighting the relationship between the tape 11 dimensions and the arrangement of the storage devices 10 in the storage system 50 according to an embodiment of the disclosed technology.

In particular, FIG. 6 shows the relationship between the tape 11 length and the x-pitch of the storage devices 10 in a storage system 50 as shown in FIG. 5A or 5B. For example, FIG. 6 relates to a storage system 50 with an in-plane storage density of 1 Tb/mm$^2$. Thereby, a bit pitch of 30 nm and a y-pitch driver efficiency (see FIGS. 5A and 5B) of 0.8 is assumed. Folding strategies can allow for longer tapes or tubes to be enclosed in low-profile memory packages (<5 mm thickness).

When scaling down the size of each storage device 10, more devices 10 can be present in the same overall area. If the total storage capacity is fixed, for example to 1 Tb/mm$^2$, the length of the tape 11 can be decreased for each storage device 10. Eventually when scaling to a critical dimension, the tape 11 lengths for a certain storage density becomes shorter than half the height of the storage system 50. As this point, no tape folding is required (indicated by the dashed line in FIG. 6), thus, simplifying the implementation. Here, scaling may refer to equal scaling of absolute X-pitch and Y-pitch as indicated in FIG. 5A, for example, assuming the maximum width of the tape is 80% of the full Y-pitch (~Y-efficiency=80%).

Figure 7:
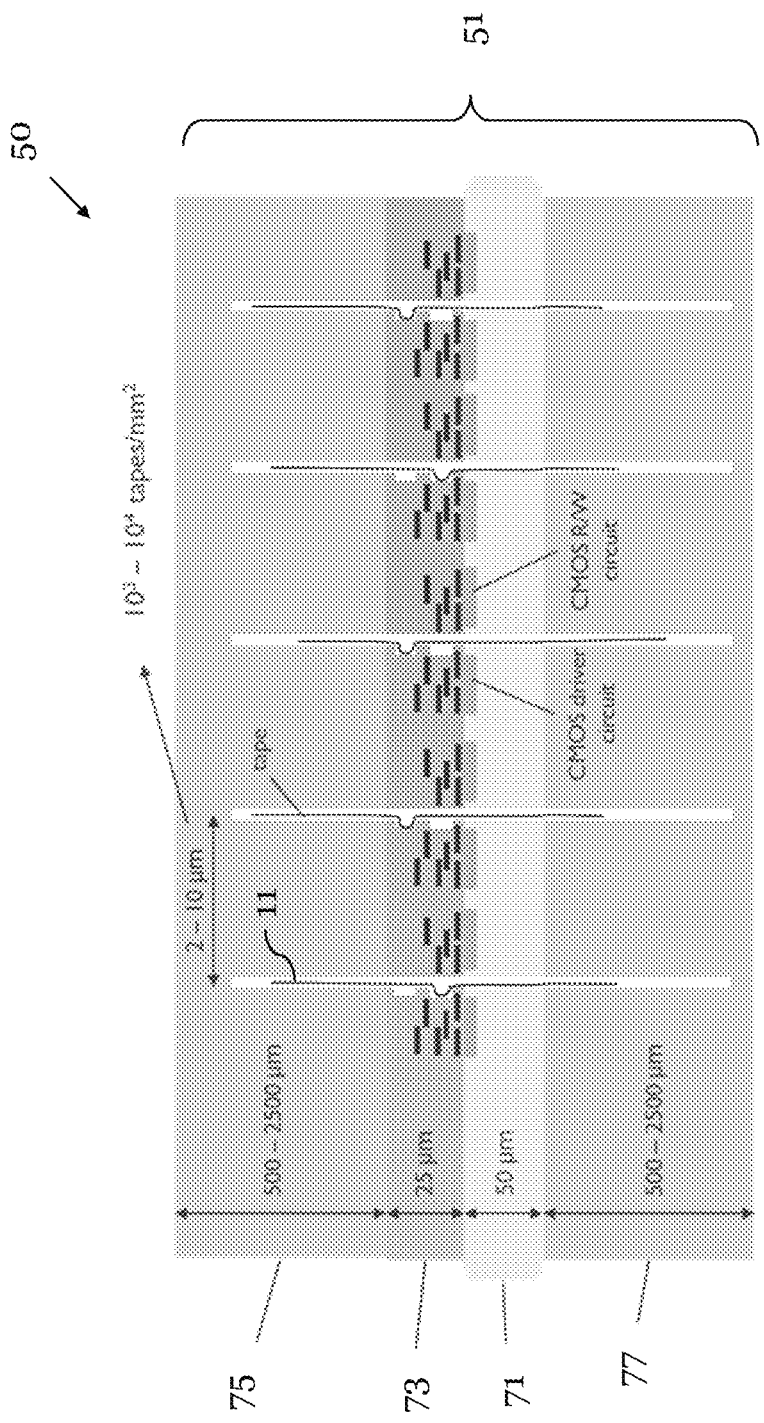
FIG. 7 shows a schematic diagram of a storage system according to an embodiment of the disclosed technology.

FIG. 7 shows a schematic diagram of the storage system 50 according to another embodiment of the disclosed technology.

In particular, FIG. 7 shows a cross-sectional view of a storage system 50, where the storage devices are embedded in a substrate 51, which includes a silicon wafer 71, a MEMS layer 73, and top and bottom encapsulation layers 75, 77.

The storage system 50 shown in FIG. 7 is an example for a high level implementation of the storage devices shown in FIGS. 1, 2A, 2B, 3, 4A, and 4B. The storage system 50 may include a large array of independent storage devices 10 ($10^3$-$10^4$ tapes/mm$^2$) embedded in a centimeter-sized small-outline package. Thereby, each storage device 10 may include the micromechanical actuator 15 and the data head 14, for example, in the form of a MEMS layer, and the micro/nanotape 11 which serves as the storage medium. Each storage device 10 may further include a CMOS driver circuit and an R/W circuit (silicon layer). The top and bottom encapsulation layers 75, 77 can provide a means of guiding the displacement of the tape 11. Additional tape storage management, for example tape folding, can be implemented in the encapsulation layers 75, 77.

Although the present disclosed technology has been illustrated by reference to specific embodiments, it will be apparent to those skilled in the art that the disclosed technology is not limited to the details of the foregoing illustrative embodiments, and that the present disclosed technology may be embodied with various changes and modifications without departing from the scope thereof.

It will furthermore be understood that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the disclosed technology are capable of operating according to the disclosed technology in other sequences, or in orientations different from the one(s) described or illustrated above.

What is claimed is:

1. A storage device, comprising:
   a tape configured to store data;
   a data head configured to read and/or write data from and/or to the tape; and
   an actuator configured to move the tape in a length direction in a step-wise manner, wherein the actuator comprises:
   a plurality of pulling electrodes, wherein each pulling electrode is configured to be activated to exert a pulling force on the tape, and
   a plurality of clamping electrodes, wherein each clamping electrode is configured to be activated to clamp the tape.

2. The storage device of claim 1, wherein the plurality of pulling electrodes and the plurality of clamping electrodes are alternately arranged along the length of the tape.

3. The storage device of claim 1, wherein the tape comprises a conductive layer on a bottom side of the tape, which is configured to act as a counter electrode for the plurality of pulling electrodes and the plurality of clamping electrodes, respectively.

4. The storage device of claim 3, wherein the plurality of pulling electrodes and the plurality of clamping electrodes are arranged below the bottom side of the tape facing the conductive layer.

5. The storage device of claim 1, wherein the plurality of pulling electrodes are arranged at a further distance from the tape than the plurality of clamping electrodes.

6. The storage device of claim 1, wherein, if activated, each pulling electrode is configured to deform a section of the tape by pulling the section away from a longitudinal axis of the tape, wherein the deformation causes the pulling force on the tape.

7. The storage device of claim 1, wherein the actuator is configured to move the tape in a first direction by:
   a) activating a first clamping electrode of the plurality of clamping electrodes;
   b) activating a pulling electrode of the plurality of pulling electrodes that is arranged behind the first clamping electrode relative to the first direction;
   c) activating a second clamping electrode of the plurality of clamping electrodes that is arranged behind the pulling electrode relative to the first direction and simultaneously or subsequently deactivating the first clamping electrode; and
   d) deactivating the pulling electrode.

8. The storage device of claim 1, wherein the actuator is configured to activate each clamping electrode by applying a clamping voltage to the clamping electrode, and wherein the actuator is configured to activate each pulling electrode by applying a pulling voltage to the pulling electrode.

9. The storage device of claim 8, wherein the actuator is configured to control a movement speed of the tape by adjusting the pulling voltage and/or by adjusting an activation frequency of the pulling electrodes and clamping electrodes, respectively.

10. The storage device of claim 1, wherein the tape further comprises a bulk material, the bulk material comprising polyethylene naphthalate (PEN).

11. The storage device of claim 1, wherein one or more surface regions of the tape are configured to store the data.

12. The storage device of claim 1, wherein the data head is arranged over a top side of the tape opposite to a bottom side.

13. The storage device of claim 1, wherein, in a first mode of the storage device, the data head is configured to read and/or write data from and/or to the tape while the tape is stationary; and wherein, in a second mode of the storage device, the data head is configured to read and/or write data from and/or to the tape while the tape is moving.

14. The storage device of claim 1, further comprising:
   two cavities which are arranged, in the length direction, in front of and behind the actuator, respectively;
   wherein each cavity is configured to receive an end part of the tape.

15. The storage device of claim 14, wherein the storage device is configured to fold the tape in each cavity.

16. The storage device of claim 15, further comprising:
   a plurality of folding electrodes arranged in each cavity, wherein the folding electrodes are configured to fold the tape.

17. A storage system comprising a plurality of storage devices according to claim 1 embedded in a substrate.

* * * * *